United States Patent [19]
Yanagisawa

[11] Patent Number: 5,546,826
[45] Date of Patent: Aug. 20, 1996

[54] DRIVE SYSTEM

[76] Inventor: Ken Yanagisawa, c/o Kabushiki Kaisha Mechanic Sekkei Jimusho, 5175-1, Ooaza Toyoshina, Toyoshina-machi, Minamiazumi-gun, Nagano-ken, Japan

[21] Appl. No.: 369,931

[22] Filed: Jan. 6, 1995

[30] Foreign Application Priority Data

Jan. 13, 1994 [JP] Japan .................................. 6-002066

[51] Int. Cl.$^6$ ............................ F16H 57/12; F16H 25/20; F16H 19/04
[52] U.S. Cl. ..................... 74/490.09; 74/89.15; 74/89.17; 74/409; 108/20; 108/143
[58] Field of Search ............................... 74/89.15, 89.17, 74/409, 422, 490.09; 108/20, 143

[56] References Cited

FOREIGN PATENT DOCUMENTS

53-36869  5/1978  Japan.
2-134443  5/1990  Japan.

*Primary Examiner*—Allan D. Herrmann
*Attorney, Agent, or Firm*—Birch, Stewart, Kolasch & Birch, LLP

[57] ABSTRACT

The object of the present invention is to provide a compact drive system, which is capable of highly synchronizing the parallel movement of travellers. In the drive system of the present invention, a pair of racks are arranged parallel in a first direction. A pair of travellers are capable of moving in the first direction. A first shaft is arranged in a second direction and rotatably connected to the travellers. A second shaft is arranged in the second direction and rotatably connected to the travellers. A pair of first pinion gears are fixed to the first shaft and respectively engaged with each rack. A pair of second pinion gears are fixed to the second shaft and respectively engaged with each rack. Driving means moves the travellers in the first direction. The first pinion gears are engaged with the racks with torsion, which has been applied to the first shaft in a first circumferential direction. The second pinion gears are engaged with the racks with torsion in a second circumferential direction.

16 Claims, 6 Drawing Sheets

DRIVE SYSTEM

BACKGROUND OF THE INVENTION

1. Field of the Invention

The present invention relates to a drive system, and more precisely relates to a drive system, which is capable of moving travellers in the same direction at the same speed.

2. Description of Background Art

Figure 8:
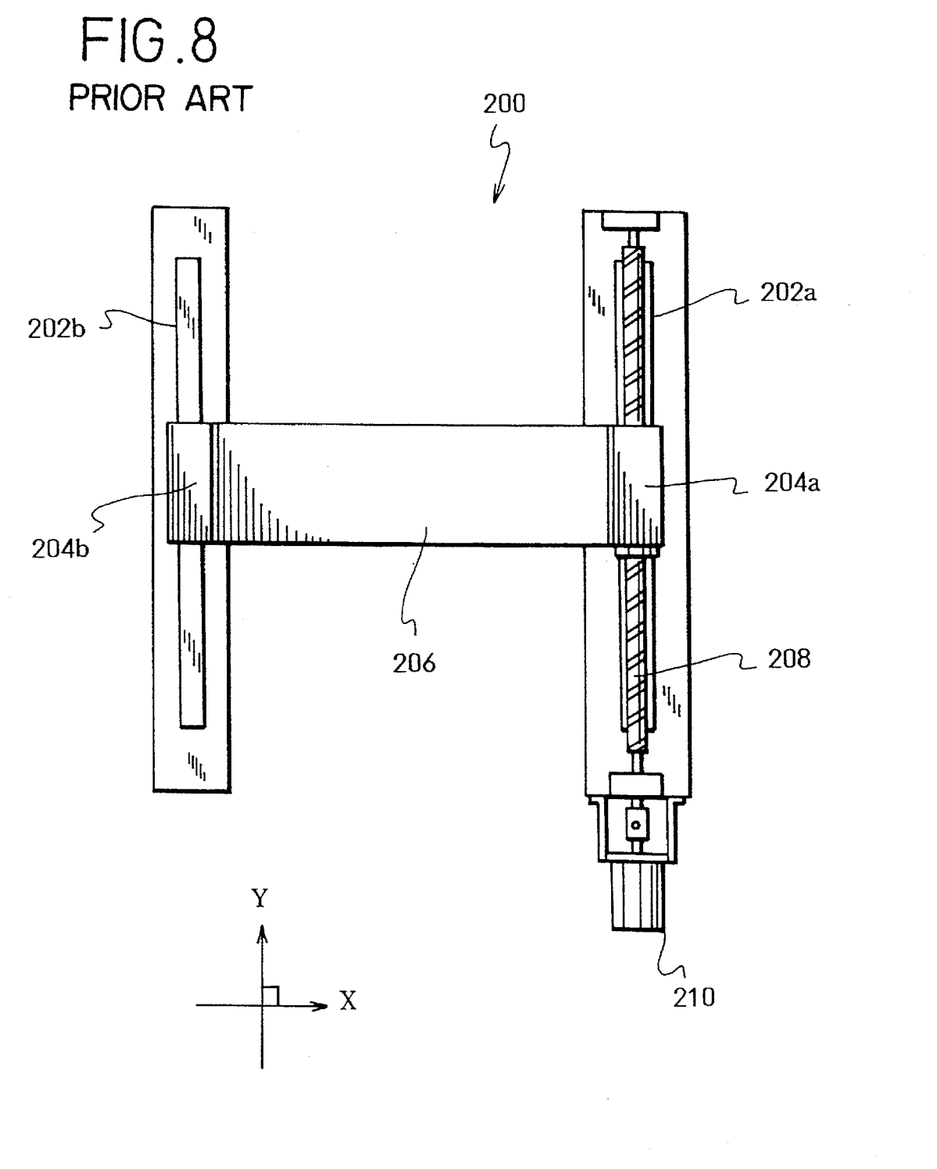
FIG. 8 is a plan view showing a conventional drive system.

A conventional drive system, which is capable of moving travellers in the same direction at the same speed, is shown in FIG. 8.

The conventional drive system 200 has a pair of linear guides 202a and 202b, which are arranged parallel in a Y-direction. A pair of travellers 204a and 204b are capable of moving in the Y-direction along the linear guides 202a and 202b. A connecting member 206 is spanned between the travellers 204a and 204b to connect both together. A ball screw 208, which is arranged in the Y-direction, is screwed with the traveller 204a. The ball screw 208 is rotated by a motor 210.

In the drive system 200, the traveller 204a is moved in the Y-direction along the linear guide 202a when the motor 210 starts and the ball screw 208 is rotated. Since the travellers 204a and 204b are connected by the connecting member 206, which is made by a tough material such as a steel, the traveller 204b is moved together with the traveller 204a.

Tools or workpieces, for example, can be attached to the connecting member 206. The attached tools or workpieces can be moved in the Y-direction together with the connecting member 206.

However, the conventional drive system 200 has following disadvantages.

The traveller 204a is directly driven by the ball screw 208; the other traveller 204b is driven by the traveller 204a with the connecting member 206. Thus, the driving force applied to the traveller 204a is not equal to that applied to the traveller 204b. The traveller 204a begins to move before the traveller 204b when the motor 210 starts. By the time lag, the connecting member 206, which must be parallel to an X-axis for precise operation, inclines with respect to the X-axis, so that positioning accuracy of the tools or the workpieces, which have been attached to the connecting member 206 is decreased. Namely, it is impossible to precisely synchronize the parallel movement of the travellers 204a and 204b when the driving force applied to the travellers 204a and 204b is unbalanced, so that the precise positioning cannot be executed. Further, the same problem occurs when external force is applied to any movable sections.

To solve the problems, which are caused by the unbalanced driving force applied to the travellers 204a and 204b and the external force applied to the movable sections, a tougher and thicker connecting member 206 has been employed to reduce said starting time lag between the travellers 204a and 204b. But the movable sections must be heavier, so that high speed operation cannot be executed. Further, load of the motor 210 must be greater, so that a motor having greater torque must be required for the motor 210.

SUMMARY OF THE INVENTION

An object of the present invention is to provide a light and compact drive system, which is capable of highly synchronizing the parallel movement of travellers.

To achieve the object, a first basic structure of the drive system of the present invention comprises:

a pair of racks being arranged parallel in a first direction;

a pair of travellers being capable of moving parallel to the racks in the first direction;

a first shaft being arranged in a second direction perpendicular to the first direction, the first shaft being rotatably connected to the travellers;

a second shaft being arranged in the second direction, the second shaft being rotatably connected to the travellers;

a pair of first pinion gears being fixed to the first shaft, the first pinion gears being respectively engaged with each rack and capable of rolling thereon;

a pair of second pinion gears being fixed to the second shaft, the second pinion gears being respectively engaged with each rack and capable of rolling thereon; and driving means for moving the travellers in the first direction, wherein the first pinion gears are engaged with the racks with torsion, which has been applied to the first shaft, in a first circumferential direction with respect thereto, and wherein the second pinion gears are engaged with the racks with torsion, which has been applied to the second shaft, in a second circumferential direction with respect thereto, which is the opposite direction of the first circumferential direction.

Further, a second basic structure of the drive system of the present invention comprises:

a pair of first racks being arranged parallel in a first direction;

a pair of second racks being arranged parallel in a second direction perpendicular to the first direction;

a pair of first travellers being capable of moving parallel to the first racks in the first direction;

a pair of second travellers being capable of moving parallel to the second racks in the second direction;

a first shaft being arranged in the second direction, the first shaft being rotatably connected to the first travellers;

a second shaft being arranged in the second direction, the second shaft being rotatably connected to the first travellers;

a third shaft being arranged in the first direction, the third shaft being rotatably connected to the second travellers;

a fourth shaft being arranged in the first direction, the fourth shaft being rotatably connected to the second travellers;

a pair of first pinion gears being fixed to the first shaft, the first pinion gears being respectively engaged with each first rack and capable of rolling thereon;

a pair of second pinion gears being fixed to the second shaft, the second pinion gears being respectively engaged with each first rack and capable of rolling thereon;

a pair of third pinion gears being fixed to the third shaft, the third pinion gears being respectively engaged with each second rack and capable of rolling thereon;

a pair of fourth pinion gears being fixed to the fourth shaft, the fourth pinion gears being respectively engaged with each second rack and capable of rolling thereon;

first driving means for moving the first travellers in the first direction; and second driving means for moving the second travellers in the second direction, wherein the first pinion gears are engaged with the first racks with torsion, which has been applied to the first shaft, in a first circumferential direction with respect thereto, wherein the second pinion gears are engaged with the first racks with torsion, which has been applied to the second shaft, in a second circumferential direction with respect thereto, which is the opposite direction of the first circumferential direction, wherein the third pinion gears are engaged with the second racks with torsion, which has been applied to the third shaft, in a third circumferential direction with respect thereto, and wherein the fourth pinion gears are engaged with the second racks with torsion, which has been applied to the fourth shaft, in a fourth circumferential direction with respect thereto, which is the opposite direction of the third circumferential direction.

In the above described first basic structure, the first pinion gears are engaged with the racks with the torsion in the first circumferential direction; the second pinion gears are engaged with the racks with the torsion in the second circumferential direction. Therefore, tooth faces of the first pinion gears are pressed onto tooth faces of the racks by the elastic force (reverse torsion) of the first shaft in the second circumferential direction, which is caused by the torsion therein; tooth faces of the second pinion gears are pressed onto the tooth faces of the racks by the elastic force (reverse torsion) of the second shaft in the first circumferential direction, which is caused by the torsion therein. By pressing the tooth faces of the first pinion gears and the second pinion gears onto the tooth faces of the racks, the backlash among the gears and the racks can be removed, and the inclination of the first shaft and the second shaft with respect to the second direction can be prevented. Therefore, in spite of a simple and light structure, precise synchronized operation of the travellers can be executed even if unbalanced driving force or external force is applied to the drive system.

In the second basic structure too, the first pinion gears are engaged with the first racks with the torsion in the first circumferential direction; the second pinion gears are engaged with the first racks with the torsion in the second circumferential direction. The third pinion gears are engaged with the second racks with the torsion in the third circumferential direction; the fourth pinion gears are engaged with the second racks with the torsion in the fourth circumferential direction. Therefore, tooth faces of the first pinion gears are pressed onto tooth faces of the first racks by the elastic force (reverse torsion) of the first shaft in the second circumferential direction, which is caused by the torsion therein; tooth faces of the second pinion gears are pressed onto the tooth faces of the first racks by the elastic force (reverse torsion) of the second shaft in the first circumferential direction, which is caused by the torsion therein; tooth faces of the third pinion gears are pressed onto tooth faces of the second racks by the elastic force (reverse torsion) of the third shaft in the fourth circumferential direction, which is caused by the torsion therein; tooth faces of the fourth pinion gears are pressed onto the tooth faces of the second racks by the elastic force (reverse torsion) of the fourth shaft in the third circumferential direction, which is caused by the torsion therein. By pressing the tooth faces of the pinion gears onto the tooth faces of the racks, the backlash among the gears and the racks can be removed, and the inclination of the first shaft and the second shaft with respect to the second direction and that of the third shaft and the fourth shaft with respect to the first direction can be prevented. Therefore, in spite of a simple and light structure, precise synchronized operation of the travellers can be executed even if unbalanced driving force or external force is applied to the drive system.

BRIEF DESCRIPTION OF THE DRAWINGS

Embodiments of the present invention will now be described by way of examples and with reference to the accompanying drawings, in which.

DETAILED DESCRIPTION OF THE PREFERRED EMBODIMENTS

Preferred embodiments of the present invention will now be described in detail with reference to the accompanying drawings.

Figure 1:
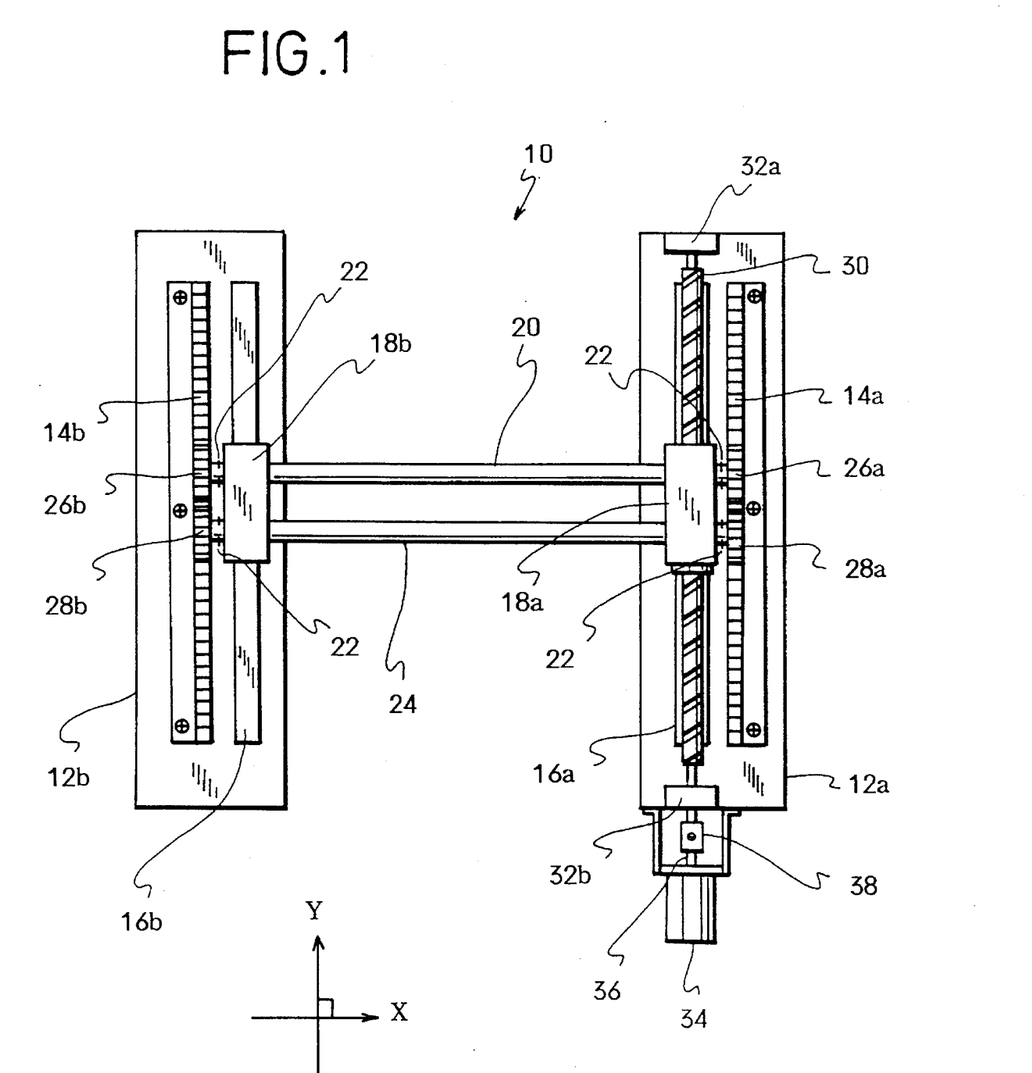
FIG. 1 is a plan view of a drive system of a first embodiment.
Figure 2:
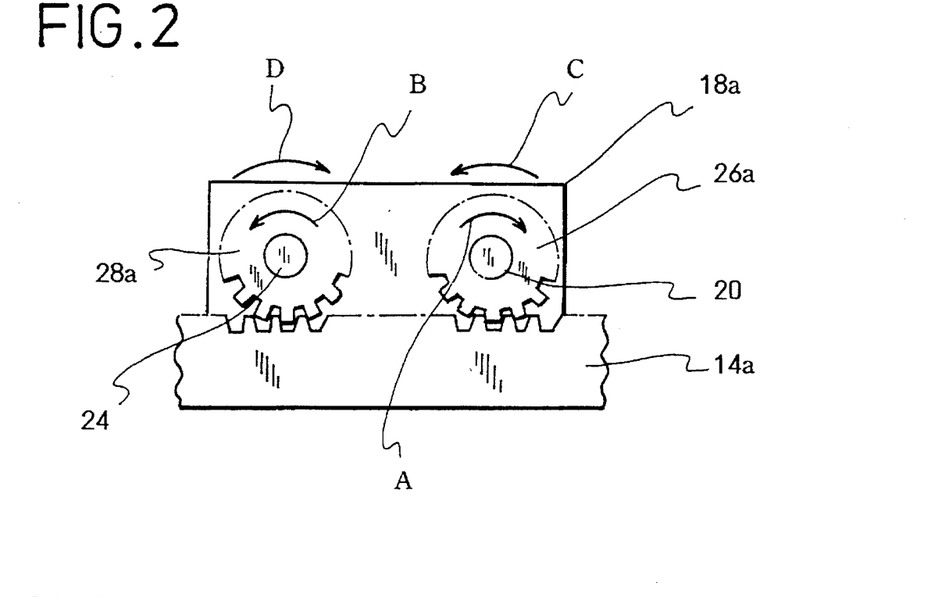
FIG. 2 is a partial side view of the first embodiment showing the vicinity of the first pinion gear and the second pinion gear.

A first embodiment will be explained with reference to FIGS. 1–3.

Bases 12a and 12b are separately provided and arranged parallel in a first direction, e.g., a Y-direction.

Racks 14a and 14b are respectively fixed on the bases 12a and 12b. The racks 14a and 14b are also arranged parallel in the Y-direction.

Linear guides 16a and 16b are respectively fixed on the bases 12a and 12b. The linear guides 16a and 16b are provided inside of the racks 14a and 14b and also arranged parallel in the Y-direction.

Travellers 18a and 18b are slidably fitted with each linear guide 16a and 16b. The travellers 18a and 18b cannot be detached upward from the linear guides 16a and 16b. The travellers 18a and 18b are capable of moving in the Y-direction along the linear guides 16a and 16b and moving parallel to the racks 14a and 14b.

A first shaft 20 is arranged in a second direction, e.g., an X-direction. The first shaft 20 is made of a metal. The first shaft 20 is rotatably pierced through the travellers 18a and 18b. Both end sections of the first shaft 20 are projected outward from the travellers 18a and 18b. There are fitted snap rings 22 on circumferential faces of the end sections of the first shaft 20, which project outward from the travellers 18a and 18b. The snap rings 22 limit the first shaft 20 to move in the axial direction.

A second shaft 24 is arranged in the X-direction. The second shaft 24 is also made of a metal. The second shaft 24 is rotatably pierced through the travellers 18a and 18b. Both end sections of the second shaft 24 project outward from the travellers 18a and 18b. There are fitted snap rings 22 on circumferential faces of the end sections of the second shaft 24, which project outward from the travellers 18a and 18b. The snap rings 22 limit the second shaft 24 to move in the axial direction.

Note that, the travellers 18a and 18b can be integrally moved in the Y-direction since the first shaft 20 and the second shaft 24 are pierced through the travellers 18a and 18b.

First pinion gears 26a and 26b are fixed at each end of the first shaft 20. The first pinion gears 26a and 26b are respectively engaged with each rack 14a and 14b and capable of rolling on the racks 14a and 14b. With this structure, the first pinion gears 26a and 26b rotate together with the first shaft 20 and roll on the racks 14a and 14b when the travellers 18a and 18b are moved in the Y-direction.

Second pinion gears 28a and 28b are fixed at each end of the second shaft 24. The second pinion gears 28a and 28b are respectively engaged with each rack 14a and 14b and capable of rolling on the racks 14a and 14b. With this structure, the second pinion gears 28a and 28b rotate together with the second shaft 24 and roll on the racks 14a and 14b when the travellers 18a and 18b are moved in the Y-direction.

A ball screw 30, which constitutes driving means for moving the travellers 18a and 18b, is on the base 12a and arranged in the Y-direction. The ball screw 30 is rotatably spanned between supporting members 32a and 32b, which are fixed on the base 12a. The ball screw 30 is screwed with the traveller 18a. Thus, the travellers 18a and 18b are moved in the Y-direction when the ball screw 30 is rotated about its axial line.

A servo motor 34, which constitutes the driving means, is fixed to the base 12a. An output shaft 36 of the motor 34 is connected with the ball screw 30 by a coupler 38. The moving speed and the moving direction of the travellers 18a and 18b are defined by the rotational speed and the rotational direction of the motor 34.

In the drive system 10 having the above described structure, the traveller 18a is moved along the linear guide 16a in the Y-direction when the motor 34 rotates the ball screw 30. Since the traveller 18b is connected with the traveller 18a by the first shaft 20 and tile second shaft 24, the travellers 18a and 18b are synchronously moved in the same direction at the same speed. If tools or workpieces, for example, are attached and allow the first shaft 20 and the second shaft 24 to rotate, the tools or the workpieces can be moved and positioned in the Y-direction.

Successively, the first pinion gears 26a and 26b and the second pinion gears 28a and 28b will be explained in detail with reference to FIGS. 2 and 3.

Figure 3:
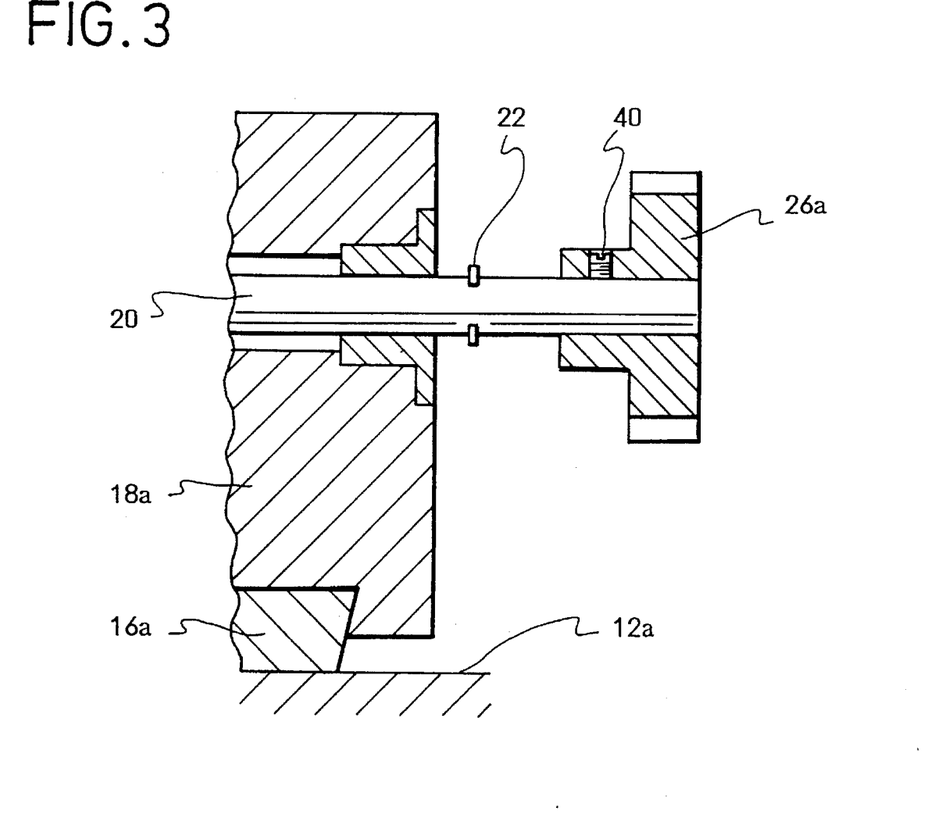
FIG. 3 is a partial sectional view of the first embodiment showing the vicinity of the first pinion gear.

As clearly shown in FIG. 3, the first pinion gear 26a covers the end section of the first shaft 20 and is fixed thereon by applying a large force to a screw 40. The pinion gear 26b (not shown in FIG. 3) is also fixed on the other end section of the first shaft 20 by the same manner. And the second pinion gears 28a and 28b are fixed on the end sections of the second shaft 24 as well as the first pinion gears 26a and 26b.

The first pinion gears 26a and 26b are engaged with the racks 14a and 14b with torsion, which has been previously applied to the first shaft 20, in a first circumferential direction (a direction shown by an arrow A) with respect to the axial line of the first shaft 20. On the other hand, the second pinion gears 28a and 28b are engaged with the racks 14a and 14b with torsion, which has been previously applied to the second shaft 24, in a second circumferential direction (a direction shown by an arrow B) with respect to the axial line of the second shaft 24. The second circumferential direction B is the opposite direction of the first circumferential direction A.

A method of fixing the first pinion gears 26a and 26b on the first shaft 20, which has been pierced through the travellers 18a and 18b, will be explained.

Firstly, the first pinion gear 26b is engaged with the rack 14b and fixed on the first shaft 20 by applying a large force to the screw 40. Next, the screw 40 of the first pinion gear 26a is loosened to allow the first shaft 20 to rotate with respect to the first pinion gear 26a. In this state, the torsion in the direction of the arrow A is applied to the first shaft 20 by, for example, a torque wrench. Then the screw 40 of the first pinion gear 26a is applied with a large force while the torsion is being applied to the first shaft 20. Thus both first pinion gears 26a and 26b have now been fixed on the first shaft 20.

Next, a method of fixing the second pinion gears 28a and 28b on the second shaft 24, which has been pierced through the travellers 18a and 18b, will be explained.

Firstly, the second pinion gear 28b is engaged with the rack 14b and fixed on the second shaft 24 by applying a large force to the screw 40. Next, the screw 40 of the second pinion gear 28a is loosened to allow the second shaft 24 to rotate with respect to the second pinion gear 28a. In this state, the torsion in the direction of the arrow B is applied to the second shaft 24 by, for example, a torque wrench. Then the screw 40 of the second pinion gear 28a is screwed hard while the torsion is being applied to the second shaft 24. Thus both second pinion gears 28a and 28b have now been fixed on the second shaft 24.

Note that, the amount of the torsion applied to the first shaft 20 and the second shaft 24 may be defined on the basis of the diameter thereof. If the diameter of both shafts 20 and 24 are same, the torsion in the shafts 20 and 24 may be same.

By engaging the first pinion gears 26a and 26b, which are fixed on the first shaft 20 storing the torsion in the direction A, with the racks 14a and 14b, the first pinion gear 26a is always biased in a direction C by the elasticity (reverse torsion) of the first shaft 20; the first pinion gear 26b is always biased in the opposite direction of the direction C by the reverse torsion of the first shaft 20 as well.

On the other hand, by engaging the second pinion gears 28a and 28b, which are fixed on the second shaft 24 storing the torsion in the direction B, with the racks 14a and 14b, the second pinion gear 28a is always biased in a direction D by the elasticity (reverse torsion) of the second shaft 24; the second pinion gear 28b is always biased in the opposite direction of the direction D by the reverse torsion of the second shaft 24 as well.

With the reverse torsion, tooth faces of the first pinion gear 26a and that of the second pinion gear 28a are pressed onto tooth faces of the racks 14a by the reverse torsion in the opposite directions. And tooth faces of the first pinion gear 26b and that of the second pinion gear 28b are pressed onto tooth faces of the racks 14b by the reverse torsion in the opposite directions as well. Since the tooth faces of the pinion gears 26a, 26b, 28a and 28b are always pressed onto the tooth faces of the racks 14a and 14b by the reverse torsion, the backlash among the pinion gears 26a, 26b, 28a and 28b and the racks 14a and 14b can be removed.

In the first embodiment, a couple of shafts 20 and 24 are employed in which the torsion in the opposite circumferential directions has been previously stored. As a result, the reverse torsion in the opposite circumferential directions always works on the shafts 20 and 24, so that the torsion stored in the shafts 20 and 24 can be maintained during operation. By maintaining the stored torsion, the inclination of the shafts 20 and 24 with respect to the X-direction, for example, can be prevented, so that the tools, the workpieces, etc., which have been attached to the movable sections, e.g., the travellers 18a and 18b, the first shaft 20, the second shaft 24, can be positioned with high positioning accuracy.

The traveller 18*a* is directly driven by the ball screw 30; the traveller 18*b* follows the traveller 18*a*. Therefore, the bending moment of the shafts 20 and 24 can be converted to the twisting moment or the torque, so that the followability of the traveller 18*b* can be increased. As a result, the tools, etc., can be positioned with higher positioning accuracy.

Note that, in the first embodiment, a couple of parallel shafts 20 and 24 in which the torsion in the opposite circumferential directions is respectively stored are employed but the number of the shafts is not limited to two. For example, a plurality of couples of shafts, with balanced torsion in the first circumferential direction and the second circumferential direction, may be employed.

Figure 4:
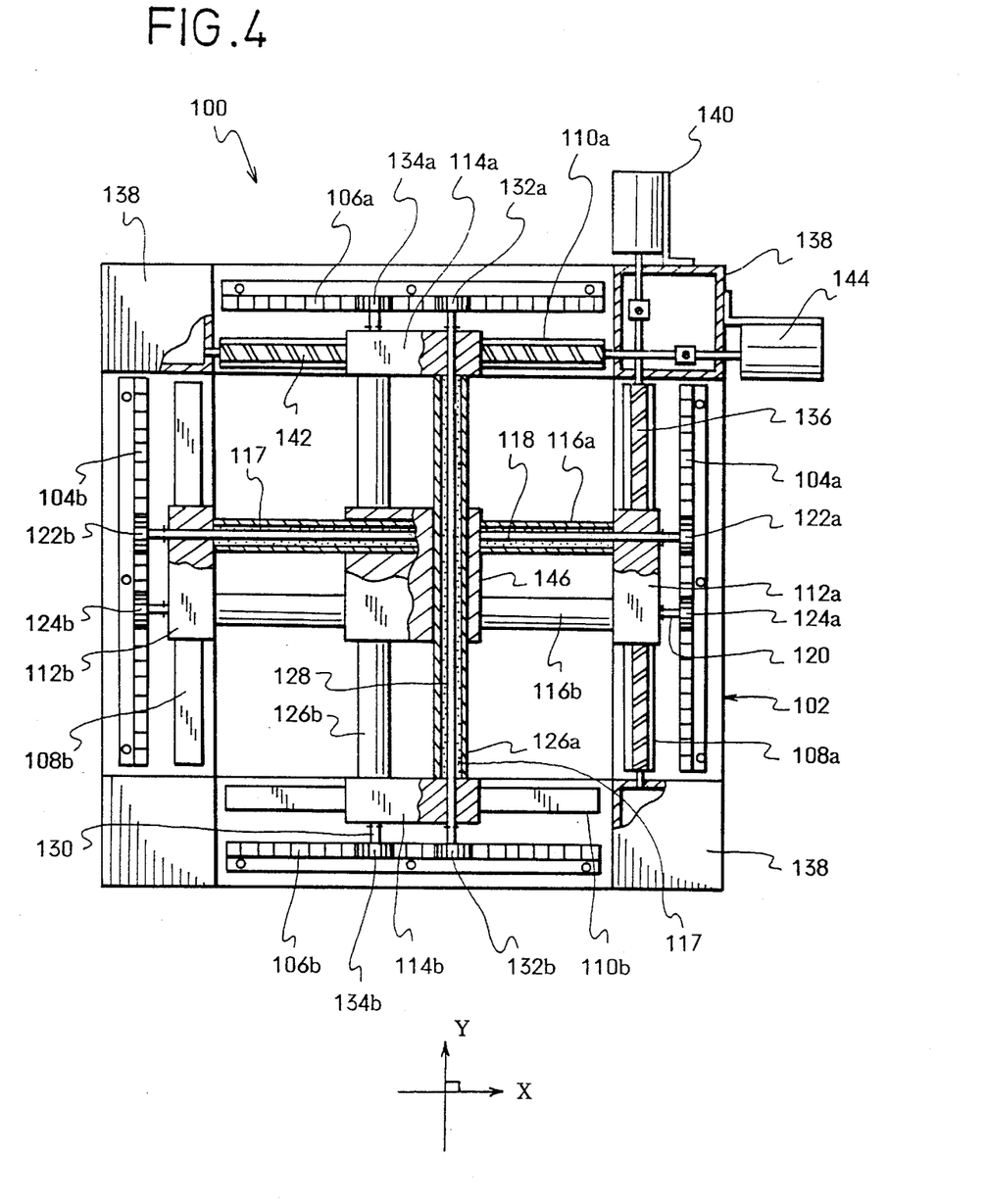
FIG. 4 is a plan view showing a drive system of a second embodiment.

A second embodiment will be explained with reference to FIG. 4.

A base 102 is formed into a hollow rectangular frame shape.

First racks 104*a* and 104*b* are respectively fixed on the base 102. The first racks 104*a* and 104*b* are arranged parallel in the first direction, e.g., the Y-direction.

Second racks 106*a* and 106*b* are respectively fixed on the base 102. The second racks 106*a* and 106*b* are arranged parallel in the second direction, e.g., the X-direction.

First linear guides 108*a* and 108*b* are respectively fixed on the base 102. The first linear guides 108*a* and 108*b* are provided inside of the first racks 104*a* and 104*b* and also arranged parallel in the Y-direction.

Second linear guides 110*a* and 110*b* are respectively fixed on the base 102. The second linear guides 110*a* and 110*b* are provided inside of the second racks 106*a* and 106*b* and also arranged parallel in the X-direction.

First travellers 112*a* and 112*b* are slidably fitted with each first linear guide 108*a* and 108*b*. The first travellers 112*a* and 112*b* cannot be detached upward from the first linear guides 108*a* and 108*b*. The first travellers 112*a* and 112*b* are capable of moving in the Y-direction along the first linear guides 108*a* and 108*b* and moving parallel to the first racks 104*a* and 104*b*.

Second travellers 114*a* and 114*b* are slidably fitted with each second linear guide 110*a* and 110*b*. The second travellers 114*a* and 114*b* cannot be detached upward from the second linear guides 110*a* and 110*b*. The second travellers 114*a* and 114*b* are capable of moving in the X-direction along the second linear guides 110*a* and 110*b* and moving parallel to the second racks 106*a* and 106*b*.

A first shaft 118 is arranged in the X-direction. The first shaft 118 is made of a metal. The first shaft 118 is rotatably pierced through a first pipe 116*a*, whose ends are respectively fixed to the first travellers 112*a* and 112*b*, and the first travellers 112*a* and 112*b*. Both end sections of the first shaft 118 project outward from the first travellers 112*a* and 112*b*. There are fitted snap rings on circumferential faces of the end sections of the first shaft 118, which project outward from the first travellers 112*a* and 112*b*. The snap rings limit the first shaft 118 to move in the axial direction.

A second shaft 120 is arranged in the X-direction. The second shaft 120 is made of a metal. The second shaft 120 is rotatably pierced through a first pipe 116*b*, whose ends are respectively fixed to the first travellers 112*a* and 112*b*, and the first travellers 112*a* and 112*b*. Both end sections of the second shaft 120 project outward from the second travellers 112*a* and 112*b*. There are fitted snap rings on circumferential faces of the end sections of the second shaft 120, which project outward from the second travellers 112*a* and 112*b*. The snap rings limit the second shaft 120 to move in the axial direction.

Note that, the first travellers 112*a* and 112*b* can be integrally moved in the Y-direction since the first pipes 116*a* and 116*b* are spanned between the first travellers 112*a* and 112*b* and the first shaft 118 and the second shaft 120 are pierced therethrough. The first pipes 116*a* and 116*b* are filled with lubricant 117, e.g., grease, to prevent abrasion and noise between the shafts 118 and 120 and the pipes 116*a* and 116*b*.

First pinion gears 122*a* and 122*b* are fixed at each end of the first shaft 118. The first pinion gears 122*a* and 122*b* are respectively engaged with each first rack 104*a* and 104*b* and are capable of rolling on the first racks 104*a* and 104*b*. With this structure, the first pinion gears 122*a* and 122*b* rotate together with the first shaft 118 and roll on the first racks 104*a* and 104*b* when the first travellers 112*a* and 112*b* are moved in the Y-direction.

Second pinion gears 124*a* and 124*b* are fixed at each end of the second shaft 120. The second pinion gears 124*a* and 124*b* are respectively engaged with each rack 104*a* and 104*b* and are capable of rolling on the first racks 104*a* and 104*b*. With this structure, the second pinion gears 124*a* and 124*b* rotate together with the second shaft 120 and roll on the first racks 104*a* and 104*b* when the first travellers 112*a* and 112*b* are moved in the Y-direction.

Second pipes 126*a* and 126*b* are arranged in the Y-direction. Ends of each second pipe 126*a* and 126*b* are respectively fixed to the second travellers 114*a* and 114*b*.

A third shaft 128 is arranged in the Y-direction. The third shaft 128 is made of a metal. The third shaft 128 is rotatably pierced through the second pipe 126*a* and the second travellers 114*a* and 114*b*. Both end sections of the third shaft 128 project outward from the second travellers 114*a* and 114*b*. There are fitted snap rings on circumferential faces of the end sections of the third shaft 128, which project outward from the second travellers 114*a* and 114*b*. The snap rings limit the third shaft 128 to move in the axial direction.

A fourth shaft 130 is arranged in the Y-direction. The fourth shaft 130 is made of a metal. The fourth shaft 130 is rotatably pierced through the second pipe 126*b* and the second travellers 114*a* and 114*b*. Both end sections of the fourth shaft 130 project outward from the second travellers 114*a* and 114*b*. There are fitted snap rings on circumferential faces of the end sections of the fourth shaft 130, which project outward from the second travellers 114*a* and 114*b*. The snap rings limit the fourth shaft 130 to move in the axial direction.

Note that, the second travellers 114*a* and 114*b* can be integrally moved in the X-direction since the second pipes 126*a* and 126*b* are spanned between the second travellers 114*a* and 114*b* and the third shaft 128 and the fourth shaft 130 are pierced therethrough. The second pipes 126*a* and 126*b* are filled with lubricant 117, e.g., grease, to prevent abrasion and noise between the shafts 128 and 130 and the pipes 126*a* and 126*b*.

Third pinion gears 132*a* and 132*b* are fixed at each end of the third shaft 128. The third pinion gears 132*a* and 132*b* are respectively engaged with each second rack 106*a* and 106*b* and capable of rolling on the second racks 106*a* and 106*b*. With this structure, the third pinion gears 132*a* and 132*b* rotate together with the third shaft 128 and roll on the second racks 106*a* and 106*b* when the second travellers 114*a* and 114*b* are moved in the X-direction.

Fourth pinion gears 134*a* and 134*b* are fixed at each end of the fourth shaft 130. The fourth pinion gears 134*a* and 134*b* are respectively engaged with each second rack 106*a* and 106*b* and capable of rolling on the second racks 106*a* and 106b. With this structure, the fourth pinion gears 134a and 134b rotate together with the fourth shaft 130 and roll on the second racks 106a and 106b when the second travellers 114a and 114b are moved in the X-direction.

A first ball screw 136, which constitutes first driving means for moving the first travellers 112a and 112b, is on the base 102 and arranged in the Y-direction. The first ball screw 136 is rotatably spanned between corner blocks 138, which are provided on the base 102. The first ball screw 136 is screwed with the first traveller 112a. Thus, the first travellers 112a and 112b are moved in the Y-direction when the first ball screw 136 is rotated about its axial line.

A first servo motor 140, which constitutes the first driving means, is fixed to the base 102. An output shaft of the first motor 140 is connected with the first ball screw 136 by a coupler. The moving speed and the moving direction of the first travellers 112a and 112b are defined by the rotational speed and the rotational direction of the first motor 140.

A second ball screw 142, which constitutes second driving means for moving the second travellers 114a and 114b, is on the base 102 and arranged in the X-direction. The second ball screw 142 is rotatably spanned between the corner blocks 138, which are provided on the base 102. The second ball screw 142 is screwed with the second traveller 114a. Thus, the second travellers 114a and 114b are moved in the X-direction when the second ball screw 142 is rotated about its axial line.

A second servo motor 144, which constitutes the second driving means, is fixed to the base 102. An output shaft of the second motor 144 is connected with the second ball screw 142 by a coupler. The moving speed and the moving direction of the second travellers 114a and 114b are defined by the rotational speed and the rotational direction of the second motor 144.

A moving body 146 is capable of moving on the first pipes 116a and 116b and the second pipes 126a and 126b. Thus, the moving body 146 is moved in the Y-direction with the movement of the first travellers 112a and 112b; the moving body 146 is moved in the X-direction with the movement of the second travellers 114a and 114b. Members to be mounted, e.g., tools, workpieces, robot heads, can be mounted on the moving body 146 and they can be moved in the X-Y direction with the moving body 146. Note that, the moving body 146 is moved on the pipes 116a, 116b, 126a and 126b in the second embodiment but the moving body 146 may be moved on the shafts 118, 120, 128 and 130.

In the drive system 100 having the above described structure, the first traveller 112a is moved along the first linear guide 108a in the Y-direction together with the moving body 146 when the first motor 140 rotates the first ball screw 136. Since the first traveller 112b is connected with the first traveller 112a by the first pipes 116a and 116b, the first travellers 112a and 112b are synchronously moved in the same direction at the same speed. On the other hand, the second traveller 114a is moved along the second linear guide 110a in the X-direction together with the moving body 146 when the second motor 144 rotates the second ball screw 142. Since the second traveller 114b is connected with the second traveller 114a by the second pipes 126a and 126b, the second travellers 114a and 114b are synchronously moved in the same direction at the same speed. As described above, the members mounted on the moving body 146 can be moved and positioned in the X-Y directions.

In the second embodiment, the first pinion gears 122a and 122b, the second pinion gears 124a and 124b, the third pinion gears 132a and 132b and the fourth pinion gears 134a and 134b are fixed to the shafts 118, 120, 128 and 130 by screws as well as the first embodiment.

The first pinion gears 122a and 122b are engaged with the first racks 104a and 104b with torsion, which has been previously applied to the first shaft 118, in the first circumferential direction; the second pinion gears 124a and 124b are engaged with the first racks 104a and 104b with torsion, which has been previously applied to the second shaft 120, in the second circumferential direction, which is the opposite direction of the first circumferential direction; the third pinion gears 132a and 132b are engaged with the second racks 106a and 106b with torsion, which has been previously applied to the third shaft 128, in a third circumferential direction; and the fourth pinion gears 134a and 134b are engaged with the second racks 106a and 106b with torsion, which has been previously applied to the fourth shaft 130, in a fourth circumferential direction, which is the opposite direction of the third circumferential direction.

The pinion gears 122a, 122b, 124a, 124b, 132a, 132b, 134a and 134b may be fixed on the shafts 118, 120, 128 and 130 by, for example, the method described in the first embodiment.

Note that, the amount of the torsion applied to the first shaft 118 and the second shaft 120 may be defined on the basis of the diameter thereof. If the diameter of the both shafts 118 and 120 is same, the torsion in the shafts 118 and 120 may be same. And the amount of the torsion applied to the third shaft 128 and the fourth shaft 130 may be defined on the basis of the diameter thereof. If the diameter of both shafts 128 and 130 is same, the torsion in the shafts 128 and 130 may be same.

By engaging the first pinion gears 122a and 122b, which are fixed on the first shaft 118 storing the torsion in the first circumferential direction, with the first racks 104a and 104b, the first pinion gear 122a is always biased in the second circumferential direction by the elasticity (reverse torsion) of the first shaft 118; the first pinion gear 122b is always biased in the first circumferential direction by the reverse torsion of the first shaft 118.

By engaging the second pinion gears 124a and 124b, which are fixed on the second shaft 120 storing the torsion in the second circumferential direction, with the first racks 104a and 104b, the second pinion gear 124a is always biased in the first circumferential direction by the elasticity (reverse torsion) of the second shaft 120; the second pinion gear 124b is always biased in the second circumferential direction by the reverse torsion of the second shaft 120.

By engaging the third pinion gears 132a and 132b, which are fixed on the third shaft 128 storing the torsion in the third circumferential direction, with the second racks 106a and 106b, the third pinion gear 132a is always biased in the fourth circumferential direction by the elasticity (reverse torsion) of the third shaft 128; the third pinion gear 132b is always biased in the third circumferential direction by the reverse torsion of the third shaft 128.

By engaging the fourth pinion gears 134a and 134b, which are fixed on the fourth shaft 130 storing the torsion in the fourth circumferential direction, with the second racks 106a and 106b, the fourth pinion gear 134a is always biased in the third circumferential direction by the elasticity (reverse torsion) of the fourth shaft 130; the fourth pinion gear 134b is always biased in the fourth circumferential direction by the reverse torsion of the fourth shaft 130.

In the second embodiment, tooth faces of the first pinion gear 122a and that of the second pinion gear 124a are pressed onto tooth faces of the first rack 104a by the reverse torsion in the opposite directions. Tooth faces of the first pinion gear 122b and that of the second pinion gear 124b are pressed onto tooth faces of the first rack 104b by the reverse torsion in the opposite directions as well. Since the tooth faces of the pinion gears 122a, 122b, 124a and 124b are always pressed onto the tooth faces of the first racks 104a and 104b by the reverse torsion, the backlash among the pinion gears 122a, 122b, 124a and 124b and the first racks 104a and 104b can be removed.

Further, in the second embodiment too, a couple of the shafts 118 and 120 in which the torsion in the opposite circumferential directions has been previously stored are employed, so the inclination of the shafts 118 and 120 with respect to the X-direction can be prevented as well as the first embodiment.

Tooth faces of the third pinion gear 132a and that of the fourth pinion gear 134a are pressed onto tooth faces of the second rack 106a by the reverse torsion in the opposite directions. And tooth faces of the third pinion gear 132b and that of the fourth pinion gear 134b are pressed onto tooth faces of the second rack 106b by the reverse torsion in the opposite directions as well. Since the tooth faces of the pinion gears 132a, 132b, 134a and 134b are always pressed onto the tooth faces of the second racks 106a and 106b by the reverse torsion, the backlash among the pinion gears 132a, 132b, 134a and 134b and the second racks 106a and 106b can be removed.

Further, a couple of the shafts 128 and 130 in which the torsion in the opposite circumferential directions has been previously stored are employed, so the inclination of the shafts 128 and 130 with respect to the Y-direction can be prevented as well as the shafts 118 and 120.

As the result of removing the backlash, the X-Y positioning accuracy of the moving body 146 and the members mounted thereon can be highly increased.

Note that, in the second embodiment too, a plurality of couples of shafts, whose torsion in the first circumferential direction and the second circumferential direction has been balanced, may be employed instead of the shafts 118 and 120 or the shafts 128 and 130.

Figure 5:
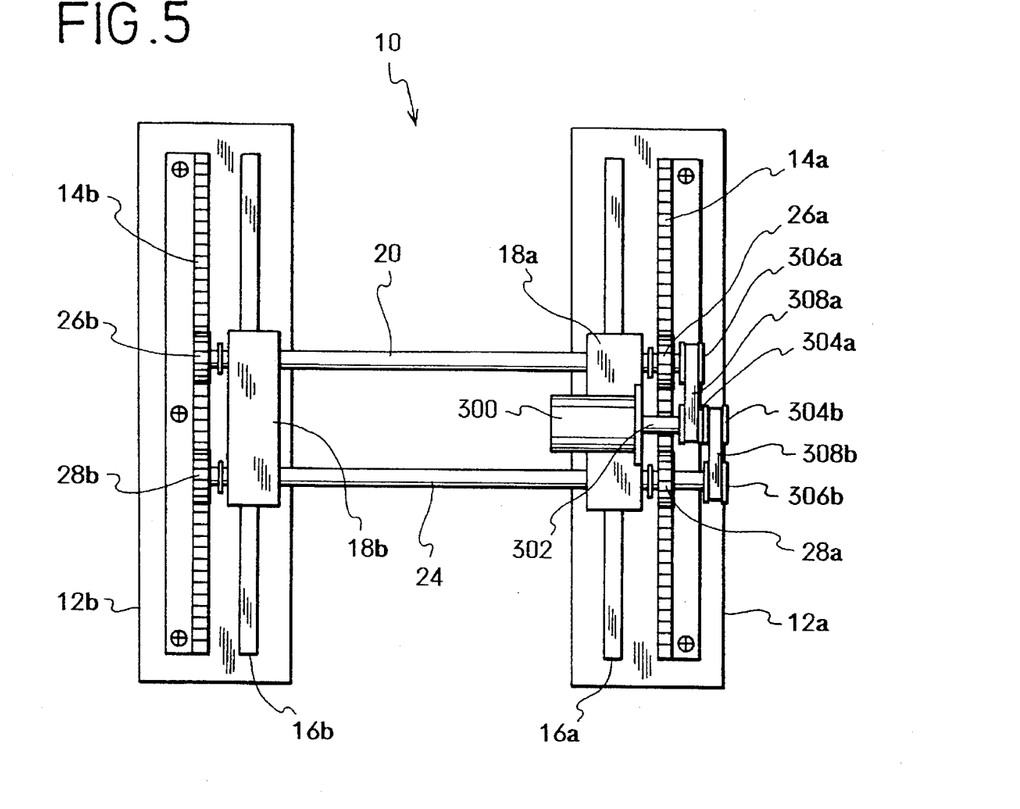
FIG. 5 is a plan view showing a drive system of a third embodiment.
Figure 6:
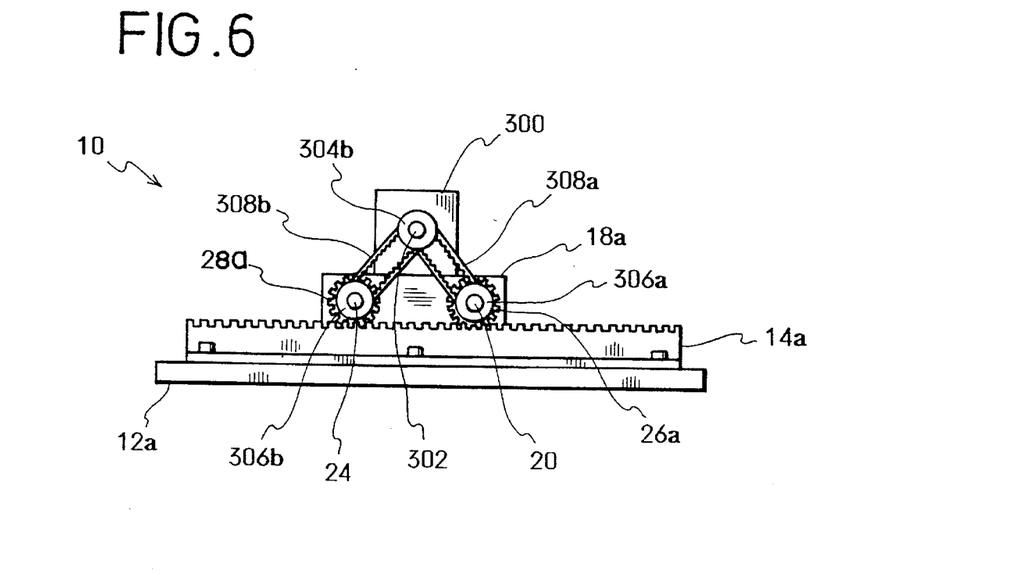
FIG. 6 is a side view of the third embodiment.

A third embodiment will be explained with reference to FIGS. 5 and 6. Note that, the third embodiment is a modification of the first embodiment, so the same members are assigned the same numeric symbols of the first embodiment and an explanation thereof will be omitted.

In the first embodiment, the ball screw 30 and the motor 34 are employed as the driving means for moving the travellers 18a and 18b. The driving means of the third embodiment comprises: a servo motor 300 mounted on the traveller 18a; and means for transmitting the rotary torque of the motor 300 to the first shaft 20 and the second shaft 24 so as to rotate the shafts 20 and 24 in the same direction.

The transmitting means of the third embodiment comprises: first timing pulleys 304a and 304b, which are fixed to an output shaft 302 of the motor 300; second timing pulleys 306a and 306b, which are respectively fixed to the first shaft 20 and the second shaft 24; a timing belt 308a, which is engaged between the first timing pulley 304a and the second timing pulley 306a; and a timing belt 308b, which is engaged between the first timing pulley 304b and the second timing pulley 306b.

When the motor 300 is driven, the shafts 20 and 24 are rotated in the same direction by the first timing pulleys 304a and 304b, the second timing pulley 306a and 306b and the timing belts 308a and 308b. With the rotation of the shafts 20 and 24, the first pinion gears 26a and 26b, which have been engaged with the racks 14a and 14b, and the second pinion gears 28a and 28b, which have been engaged with the racks 14a and 14b, roll on the racks 14a and 14b. As a result of the rolling of the pinion gears 26a, 26b, 28a and 28b, the travellers 18a and 18b, which are connected by the shafts 20 and 24, are synchronously moved in the same direction at the same speed.

The effect of removing the backlash and preventing the inclination of the shafts 20 and 24 is the same as the first embodiment.

Note that, in the third embodiment, the motor 300 rotates both of the shafts 20 and 24 with the transmitting means but the motor 300 may rotates one of the shafts 20 or 24. In this case, a coupler for connecting the output shaft 302 of the motor 300 with the shaft 20 or 24 may be employed as the transmitting means.

Figure 7:
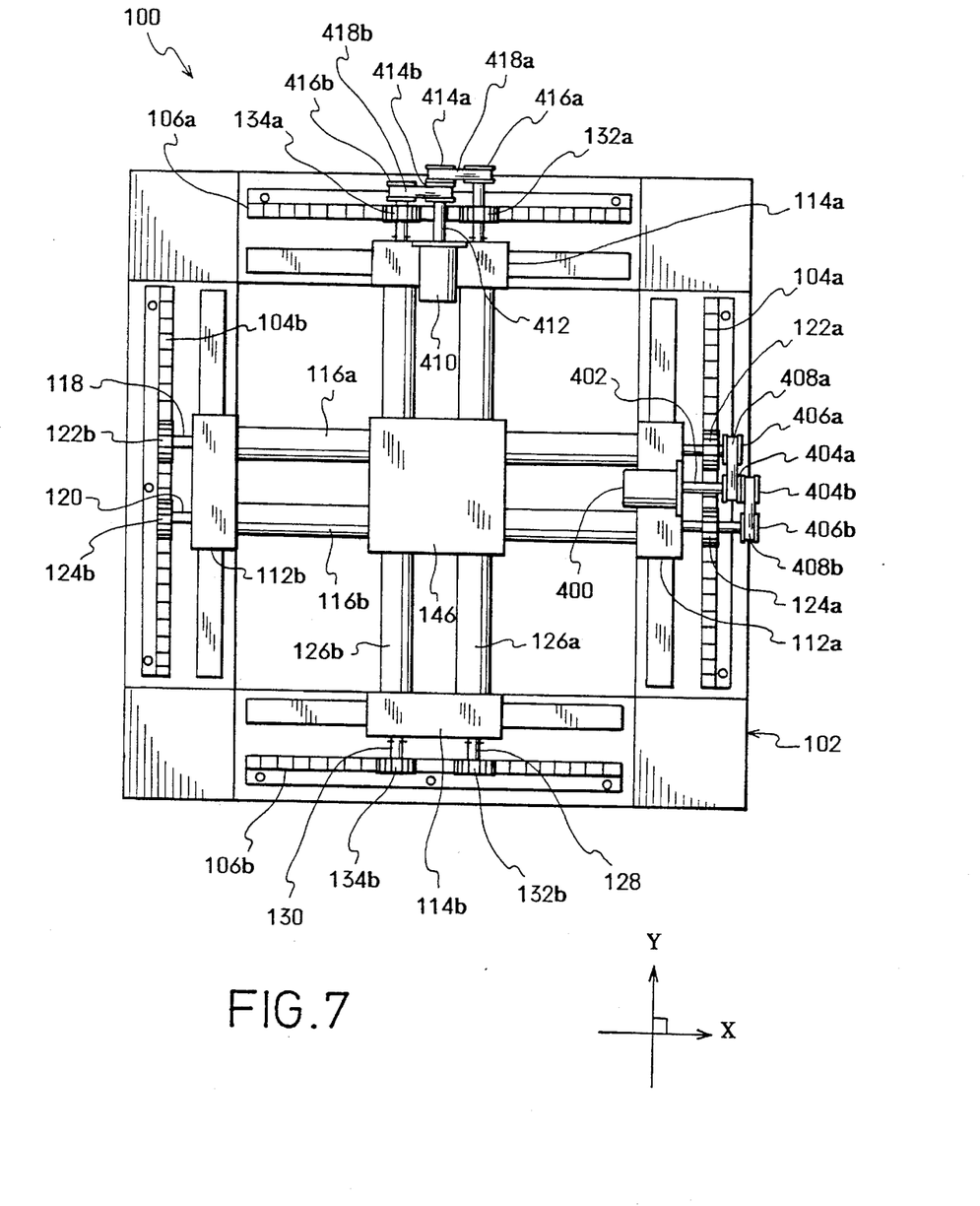
FIG. 7 is a plan view showing a drive system of a fourth embodiment.

A fourth embodiment will be explained with reference to FIG. 7. Note that, the fourth embodiment is a modification of the second embodiment, so the same members are assigned same numeric symbols of the second embodiment and an explanation thereof will be omitted.

In the second embodiment, the first ball screw 136 and the first motor 140 are employed as the first driving means for moving the first travellers 112a and 112b; and the second ball screw 142 and the second motor 144 are employed as the second driving means for moving the second travellers 114a and 114b. The first driving means of the fourth embodiment comprises: a first servo motor 400 mounted on the first traveller 112a; and first means for transmitting the rotary torque of the first motor 400 to the first shaft 118 and the second shaft 120 so as to rotate the shafts 118 and 120 in the same direction. Further, the first transmitting means comprises: first timing pulleys 404a and 404b, which are fixed to an output shaft 402 of the motor 400; second timing pulleys 406a and 406b, which are respectively fixed to the first shaft 118 and the second shaft 120; and first timing belts 408a and 408b, which are engaged between the first timing pulleys 404a and 404b and the second timing pulleys 406a and 406b.

On the other hand, the second driving means of the fourth embodiment comprises: a second servo motor 410 mounted on the second traveller 114a; and second means for transmitting the rotary torque of the second motor 410 to the third shaft 128 and the fourth shaft 130 so as to rotate the shafts 128 and 130 in the same direction. Further, the second transmitting means comprises: third timing pulleys 414a and 414b, which are fixed to an output shaft 412 of the motor 410; fourth timing pulleys 416a and 416b, which are respectively fixed to the third shaft 128 and the fourth shaft 130; and second timing belts 418a and 418b, which are engaged between the third timing pulleys 414a and 414b and the fourth timing pulleys 416a and 416b.

When the first motor 400 is driven, the first shaft 118 and the second shaft 120 are rotated in the same direction. And the third shaft 128 and the fourth shaft 130 are rotated in the same direction when the second motor 410 is driven. By the rotation of the shafts 118, 120, 128 and 130, the first travellers 112a and 112b are synchronously moved in the Y-direction at the same speed; the second travellers 114a and 114b are synchronously moved in the X-direction at the same speed, so that the moving body 146 can be moved in the X-Y directions.

The effects of removing the backlash and high positioning accuracy of the moving body 146 are the same as the second embodiment.

Note that, in the fourth embodiment, the first motor 400 rotates both of the shafts 118 and 120 with the first transmitting means but the first motor 400 may rotates one of the shafts 118 and 120. And the second motor 410 also may rotate one of the shafts 128 and 130.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A drive system, comprising:

a pair of racks being arranged parallel in a first direction;

a pair of travellers being capable of moving parallel to said racks in the first direction;

a first shaft being arranged in a second direction perpendicular to the first direction, said first shaft being rotatably connected to said travellers;

a second shaft being arranged in the second direction, said second shaft being rotatably connected to said travellers;

a pair of first pinion gears being fixed to said first shaft, said first pinion gears being respectively engaged with each rack and capable of rolling thereon;

a pair of second pinion gears being fixed to said second shaft, said second pinion gears being respectively engaged with each rack and capable of rolling thereon; and driving means for moving said travellers in the first direction, wherein said first pinion gears are engaged with said racks with torsion, which has been applied to said first shaft, in a first circumferential direction with respect thereto, and wherein said second pinion gears are engaged with said racks with torsion, which has been applied to said second shaft, in a second circumferential direction with respect thereto, which is the opposite direction of the first circumferential direction.

2. The drive system according to claim 1, wherein said driving means comprises:

a ball screw being arranged in the first direction, said ball screw being screwed with said traveller; and a motor for rotating said ball screw about an axial line thereof.

3. The drive system according to claim 1, wherein said driving means comprises:

a motor being provided to said traveller; and means for transmitting the rotary torque of said motor to at least one of said shafts so as to rotate the shaft.

4. The drive system according to claim 3, wherein said transmitting means comprises:

a first pulley being fixed to an output shaft of said motor;

a second pulley being fixed to at least one of said shafts; and a belt being respectively engaged between said first pulley and said second pulley.

5. The drive system according to claim 4, wherein said pulleys are timing pulleys, and wherein said belt is a timing belt.

6. The drive system according to claim 1, wherein said travellers are slidably fitted with linear guides.

7. A drive system, comprising:

a pair of first racks being arranged parallel in a first direction;

a pair of second racks being arranged parallel in a second direction perpendicular to the first direction;

a pair of first travellers being capable of moving parallel to said first racks in the first direction;

a pair of second travellers being capable of moving parallel to said second racks in the second direction;

a first shaft being arranged in the second direction, said first shaft being rotatably connected to said first travellers;

a second shaft being arranged in the second direction, said second shaft being rotatably connected to said first travellers;

a third shaft being arranged in the first direction, said third shaft being rotatably connected to said second travellers;

a fourth shaft being arranged in the first direction, said fourth shaft being rotatably connected to said second travellers;

a pair of first pinion gears being fixed to said first shaft, said first pinion gears being respectively engaged with each first rack and capable of rolling thereon;

a pair of second pinion gears being fixed to said second shaft, said second pinion gears being respectively engaged with each first rack and capable of rolling thereon;

a pair of third pinion gears being fixed to said third shaft, said third pinion gears being respectively engaged with each second rack and capable of rolling thereon;

a pair of fourth pinion gears being fixed to said fourth shaft, said fourth pinion gears being respectively engaged with each second rack and capable of rolling thereon;

first driving means for moving said first travellers in the first direction; and second driving means for moving said second travellers in the second direction, wherein said first pinion gears are engaged with said first racks with torsion, which has been applied to said first shaft, in a first circumferential direction with respect thereto, wherein said second pinion gears are engaged with said first racks with torsion, which has been applied to said second shaft, in a second circumferential direction with respect thereto, which is the opposite direction of the first circumferential direction, wherein said third pinion gears are engaged with said second racks with torsion, which has been applied to said third shaft, in a third circumferential direction with respect thereto, and wherein said fourth pinion gears are engaged with said second racks with torsion, which has been applied to said fourth shaft, in a fourth circumferential direction with respect thereto, which is the opposite direction of the third circumferential direction.

8. The drive system according to claim 7, further comprising a moving body, which is capable of moving in the second direction along said first shaft and said second shaft and moving in the first direction along said third shaft and said fourth shaft.

9. The drive system according to claim 7, wherein said first driving means comprises:

a first ball screw being arranged in the first direction, said first ball screw being screwed with said first traveller; and a first motor for rotating said first ball screw about an axial line thereof, and wherein said second driving means comprises:

a second ball screw being arranged in the second direction, said second ball screw being screwed with said second traveller; and a second motor for rotating said second ball screw about an axial line thereof.

10. The drive system according to claim 7, wherein said first driving means comprises:

a first motor being provided to said first traveller; and first transmitting means for transmitting the rotary torque of said first motor to at least one of said first shaft and said second shaft so as to rotate said shaft, and wherein said second driving means comprises:

a second motor being provided to said second traveller; and second transmitting means for transmitting the rotary torque of said second motor to at least one of said third shaft and said fourth shaft so as to rotate said shaft.

11. The drive system according to claim 10, wherein said first transmitting means comprises:

a first pulley being fixed to an output shaft of said first motor;

a second pulley being fixed to at least one of said first shaft and said second shaft; and a first belt being respectively engaged between said first pulley and said second pulley, and wherein said second transmitting means comprises:

a third pulley being fixed to an output shaft of said second motor;

a fourth pulley being fixed to at least one of said third shaft and said fourth shaft; and a second belt being respectively engaged between said third pulley and said fourth pulley.

12. The drive system according to claim 11, wherein said pulleys are timing pulleys, and wherein said belts are timing belts.

13. The drive system according to claim 7, further comprising:

a pair of first pipes being arranged in the second direction, each end of each first pipe being fixed to each first traveller; and a pair of second pipes being arranged in the first direction, each end of each second pipe being fixed to each second traveller, wherein said first shaft and said second shaft are rotatably pierced through each first pipe, and wherein said third shaft and said fourth shaft are rotatably pierced through each second pipe.

14. The drive system according to claim 13, further comprising a moving body, which is capable of moving in the second direction along said first pipes and moving in the first direction along said second pipes.

15. The drive system according to claim 13, wherein said first pipes and said second pipes are filled with lubricant.

16. The drive system according to claim 7, wherein said first travellers and said second travellers are slidably fitted with linear guides.

* * * * *